United States Patent
Denoue et al.

(10) Patent No.: US 10,530,718 B2
(45) Date of Patent: Jan. 7, 2020

(54) CONVERSATIONAL ENTERPRISE DOCUMENT EDITING

(71) Applicant: FUJI XEROX CO., LTD., Tokyo (JP)

(72) Inventors: Laurent Denoue, Veneto (IT); Scott Carter, Menlo Park, CA (US); Jennifer Marlow, Palo Alto, CA (US); Matthew L. Cooper, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 222 days.

(21) Appl. No.: 15/665,366

(22) Filed: Jul. 31, 2017

(65) Prior Publication Data
US 2019/0036853 A1    Jan. 31, 2019

(51) Int. Cl.
| G06F 15/16 | (2006.01) |
| H04L 12/58 | (2006.01) |
| G06F 17/24 | (2006.01) |
| G06Q 10/10 | (2012.01) |

(52) U.S. Cl.
CPC ............ *H04L 51/046* (2013.01); *G06F 17/24* (2013.01); *G06Q 10/101* (2013.01)

(58) Field of Classification Search
USPC ....................................................... 709/206
See application file for complete search history.

(56) References Cited

U.S. PATENT DOCUMENTS

| 8,938,669 | B1* | 1/2015 | Cohen ..................... G06F 16/93 715/255 |
| 9,348,803 | B2* | 5/2016 | Vagell ................... G06F 17/212 |
| 9,456,012 | B2* | 9/2016 | Cohen ..................... G06F 16/93 |
| 2013/0262574 | A1* | 10/2013 | Cohen ................. G06F 17/2765 709/204 |
| 2018/0095940 | A1* | 4/2018 | Meixner ............... H04L 51/046 |
| 2018/0121394 | A1* | 5/2018 | Denoue .................. G06F 3/013 |
| 2019/0034395 | A1* | 1/2019 | Curry ..................... G06F 17/24 |

OTHER PUBLICATIONS

Denoue et al., "FormCracker: Interactive Web-Based Form Filing". DocEng 2010 pp. 235-238.
Tenopir, Carol, et al., "Uses of Figures and Tables from Scholarly Journal Articles in Teaching and Research". Proceedings of the Meeting of the American Society for Information Science and Technology. 2007.
"Programmatically Extract Form Field Data From PDF Files", FoxIt 2013. Downloaded Jul. 31, 2017 from http://www.debenu.com/kb/programmatically-extract_form_field_data_pdf_files/. 5 pages.

* cited by examiner

*Primary Examiner* — Alicia Baturay
(74) *Attorney, Agent, or Firm* — Procopio, Cory, Hargreaves & Savitch LLP (57) ABSTRACT

Example implementations described herein are directed to systems and methods for providing documents in the chat of a chat application. Example implementations can involve detecting, in a chat of a chat application, an indication to edit a document; inserting a fragment of the document into the chat of the chat application, the fragment configured to be editable within the chat of the chat application; and modifying the document based on input provided to the fragment of the document in the chat of the chat application.

17 Claims, 9 Drawing Sheets

FIG. 1(a)

editing

---
Today

Agent
Can you please fill out these fields for me?

April 23rd

Student
Primary Phone (include Area Code):
| 5 | 0 | 5 | - | 2 | 2 | 8 | - | 5 | 6 | 4 | 5 |

Student
U.S. Social Security Number:
| X | X | X | - | X | X | - | X | X | X | X |

Agent
Chatbot filling in today. What date is best?

Student
☐ September 17, 2016   ☐ October 29, 2016   ☒ April 8, 2017

Student
Can you flag these fields and email me a PDF?

Agent
Fields are automatically flagged. PDF sent to your email!

Message editing

CONVERSATIONAL ENTERPRISE DOCUMENT EDITING

BACKGROUND

Field

The present disclosure relates to document systems, and more specifically, for editing rich documents within the context of a conversation.

Related Art

Related art enterprise documents may follow well-structured templates, ranging from very structured forms (e.g., with fields such as name, address, zip code) to less structured reports (e.g. introduction, tables, references). In related art implementations, modern workplace tools provide users with a choice of devices, screen sizes, and mobility options.

Related art implementations also involve text-centric enterprise messaging applications, which involve a low-level text-based metaphor that helps establish information flow. However, such related art implementations do not support document editing and workflow.

SUMMARY

Example implementations described herein are directed to a set of conversation-centric techniques that facilitate document editing by plugging in document content and editing tools where the conversation happens. Documents, with their advantages of high-level structure and aggregation over low-level unstructured messages, become again a first-class citizen of the modern workforce.

Example implementations can involve embedding document parts inside a text-based messaging application to author or complete the document. The document structure can be used to define the fragments. The chat content can be used to pre-populate the fragments.

Further, in example implementations, the document fragments can be removed to allow users to edit its content inside the messaging application in a structured manner: e.g., password-protected fields, check boxes, zip code, address (as opposed to letting the user enter freeform text for e.g. their name). Further, when such edits are made, example implementations are configured to inject the edited fragments back into the "final" version of the document.

Aspects of the present disclosure can include a method, which can involve detecting, in a chat of the chat application, an indication to edit a document; inserting a fragment of the document into the chat of the chat application, the fragment configured to be editable within the chat of the chat application; and modifying the document based on input made to the fragment of the document in the chat of the chat application.

Aspects of the present disclosure can include a computer program, which can involve detecting, in a chat of the chat application, an indication to edit a document; inserting a fragment of the document into the chat of the chat application, the fragment configured to be editable within the chat of the chat application; and modifying the document based on input made to the fragment of the document in the chat of the chat applications. The computer program can be stored in the form of instructions on a non-transitory computer readable medium.

Aspects of the present disclosure can include a system, which can involve means for detecting, in a chat of the chat application, an indication to edit a document; means for inserting a fragment of the document into the chat of the chat application, the fragment configured to be editable within the chat of the chat application; and means for modifying the document based on input made to the fragment of the document in the chat of the chat application.

Aspects of the present disclosure can further include an apparatus, which can involve a processor, configured to detect, in a chat of the chat application, an indication to edit a document; insert a fragment of the document into the chat of the chat application, the fragment configured to be editable within the chat of the chat application; and modify the document based on input made to the fragment of the document in the chat of the chat application.

DETAILED DESCRIPTION

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Users link to web pages and documents quite frequently. Thus, messages in a chat (e.g., facilitated by a chat channel of the chat application) can actually link to documents or talk about these documents (e.g. citing some of their content). Related art techniques have been developed to preview documents linked to in a conversation, and snippets can even be automatically extracted from documents so as to support the conversation. However, document editing is currently not supported in these related art conversation centric spaces. There is a disconnect between messages and the production of the higher level, aggregated, structured final document. As a result, conversation and document creation live in two separate siloes, only to be bridged by manually created links. This disconnect may result in unnecessary copy and paste, as well as lost information.

Example implementations are directed to utilizing document structures as a natural organizational metaphor: if one looks at the nature of enterprise documents in particular, much of their content is structured. For example, many businesses rely on forms to collect new customer data (a search query for "ext:pdf new customer form" returns over 100 million PDF documents), insurance claim forms help collect reports of accidents, documentation manuals and inventory documents are structured with lists of images and accompanying text snippets, sales and intelligence reports are structured with sections such as related work, references, tables and sales figures.

Example implementations are directed to automatically extracting the structure of a document and letting users drop the structure into a conversation. Once in the conversation, users have a chance to edit these document fragments from within their conversational platform. Existing messages are used to pre-populate parts of the fragments as well as define sub-fragments. Example implementations can also help authors repurpose modified content in new documents, a well-documented but poorly supported workplace practice. We now illustrate the invention with two scenarios.

Figure 1A:
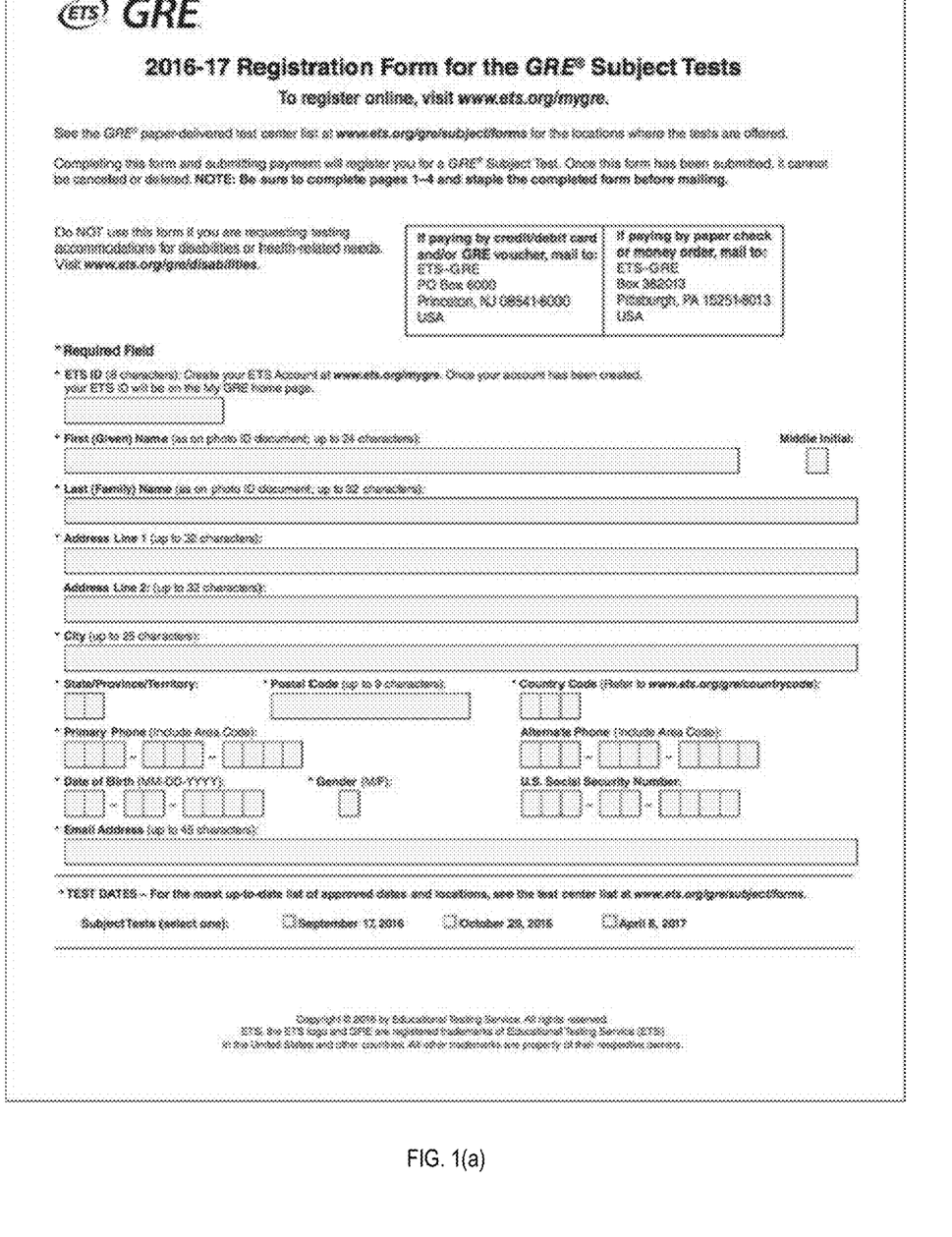
FIGS. 1(a) and 1(b) illustrate examples of form filling, in accordance with an example implementation.
Figure 1B:
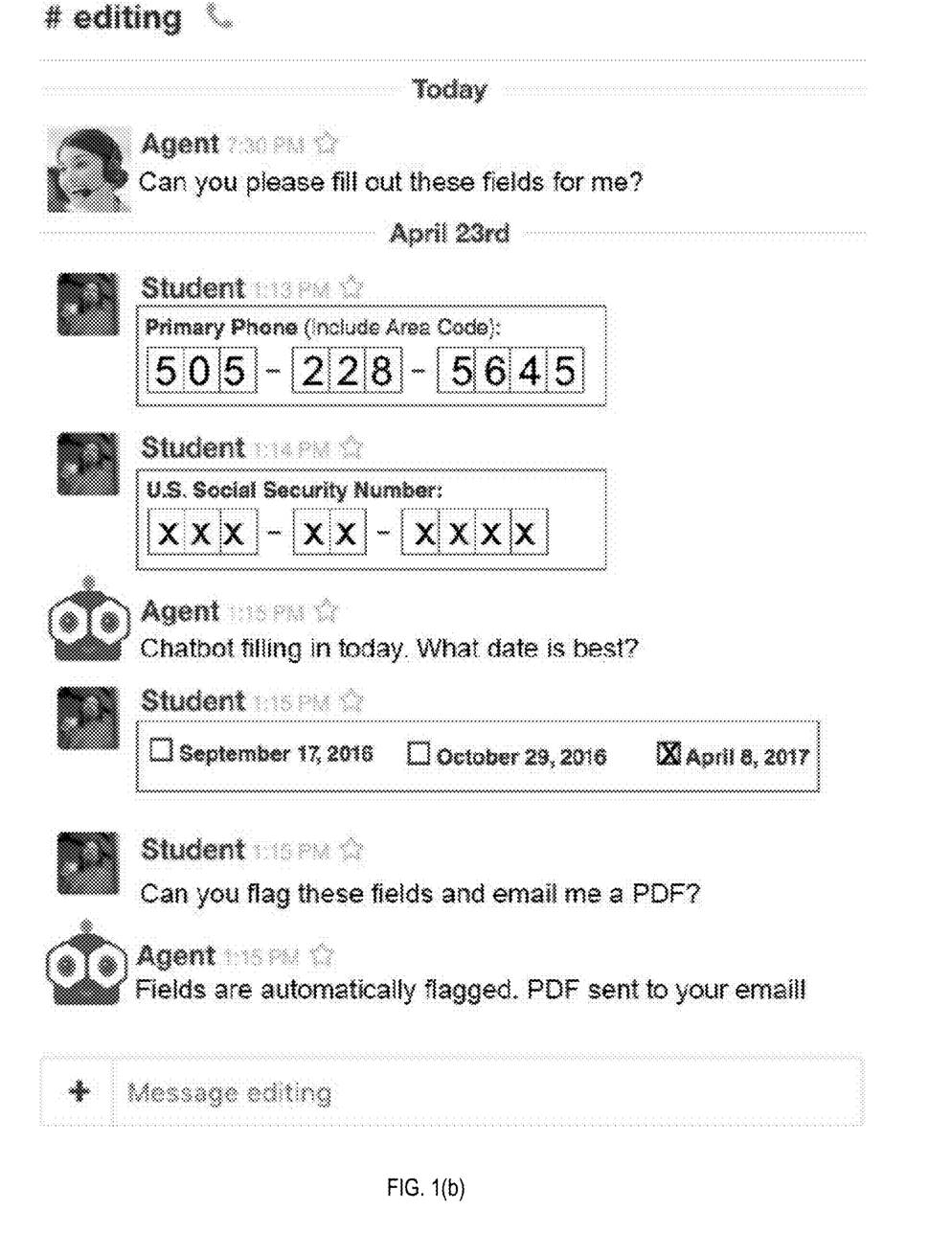

FIGS. 1(a) and 1(b) illustrate examples of form filling, in accordance with an example implementation. Specifically, FIG. 1(a) illustrates an example form that is to be filled out. When an agent drags-and-drops the form into the chat application as illustrated in FIG. 1(b), the system injects relevant fields from the form of FIG. 1(a). In the example of FIG. 1(b), the system first injects an editable primary phone number field, which can be automatically filled with information either from earlier in the chat or user profile information. The example of FIG. 1(b) illustrates an example injection of a secure, editable field, such as a phone number field. The chat agent (e.g., human or bot) can also ask questions directly and respond to basic commands.

To support form filling in the example of FIG. 1(b), an agent assisting a customer over chat drags and drops an existing form (e.g. PDF, Word, Hypertext Markup Language (HTML) document) onto the chat space augmented with the example implementations, the system first extracts the structure of the form fields and pre-populates some of the fields with data already found in the chat messages (e.g. name, data, type of problem experienced by the customer). For those fields remaining to be filled-in by the customer, example implementations "conversationalize" the document by showing the customer relevant portions of the fields that need to be filled out. Such example implementations allow the original structure to be maintained as the original form document, while the customer still interacts inside a familiar, conversational chat space. This conversation-centric mode of operation gives the company a filled out form in the end. Unlike a pure text-based approach, the agent does not need to retype or copy-and-paste data entered by the user. Moreover, security is built-in: if a field requires entering a password, the system shows a password box that would not have been possible with a pure text-based approach. Described herein are example implementations directed to how the system extracts fields, pre-populates them and presents remaining fields to the user in a conversational manner.

In related art implementations, users often access rich documents from their mobile devices. In many cases such users need to provide annotations on documents, or make edits while on mobiles, but related art applications can make such functionality difficult, if not impossible. Through the use of example implementations, users can edit document fragments in the context of a conversation. Also, that fragment can either be represented as an interactive document widget (allowing users to type in edits) or directly in the conversation thread itself (allowing users to adjust content via text or spoken commands).

Consider an example in which users are writing a new slide deck for a funding proposal and have been chatting about the topic for a few weeks using a chat application. As with the form example above, a co-worker can drag-and-drop a template slide deck into the chat space.

In example implementations, the system 1) extracts the structure of the document, 2) looks for links that were shared and prepopulates a "related proposals" section. It also finds dollar amounts and other monetary mentions to pre-populate the "market opportunities" section. The related proposals section is also pre-populated with figures and images from the chat. Unlike a document-centric creation process, the document parts can be edited inside the chat space. In addition to rule or keyword based approaches, archived reports can be used to train classifiers that capture linguistic patterns or usage in each section and can (semi-) automatically classify text from the chat stream and associate the classified text with sections from the document template.

For example, if a team member found a reference to a paper and talked about the paper in the chat, the system can already create a link to the reference as well as a summary of the discussion. Through utilizing the example implementations, Annie can start editing the paragraph (either inside a regular document-centric app or inside her chat app) and then ask John to add his suggestions. John receives the paragraph inside his mobile chat app where he can interact with a chatbot (either via typed text or orally via speech-to-text) to dictate edits to the paragraph.

Similar approaches can help users complete trip reports (where a few colleagues go see a conference and have to report their findings back home). In this scenario, the system can automatically populate preconfigured templates with photos and messages shared in the chat. The system can also help field technicians edit repair manuals. In this case, technicians can augment the original manual document, injecting multimedia passages in the chat into relevant problems in a manual. The system could be help real estate managers (or people who lease real estate on online platforms) inventory domiciles before they are rented or sold. Similar to the form-filling scenario above, the example implementations can involve using the structure of the document to assist the user into creating the document (e.g. take a picture or the kitchen, "does it have tiles?" showing "YES" "NO" buttons below). Because the creation happens in the conversational space, multiple users can readily participate. The system could also be useful in standard, interactive coding documents.

Figure 2A:
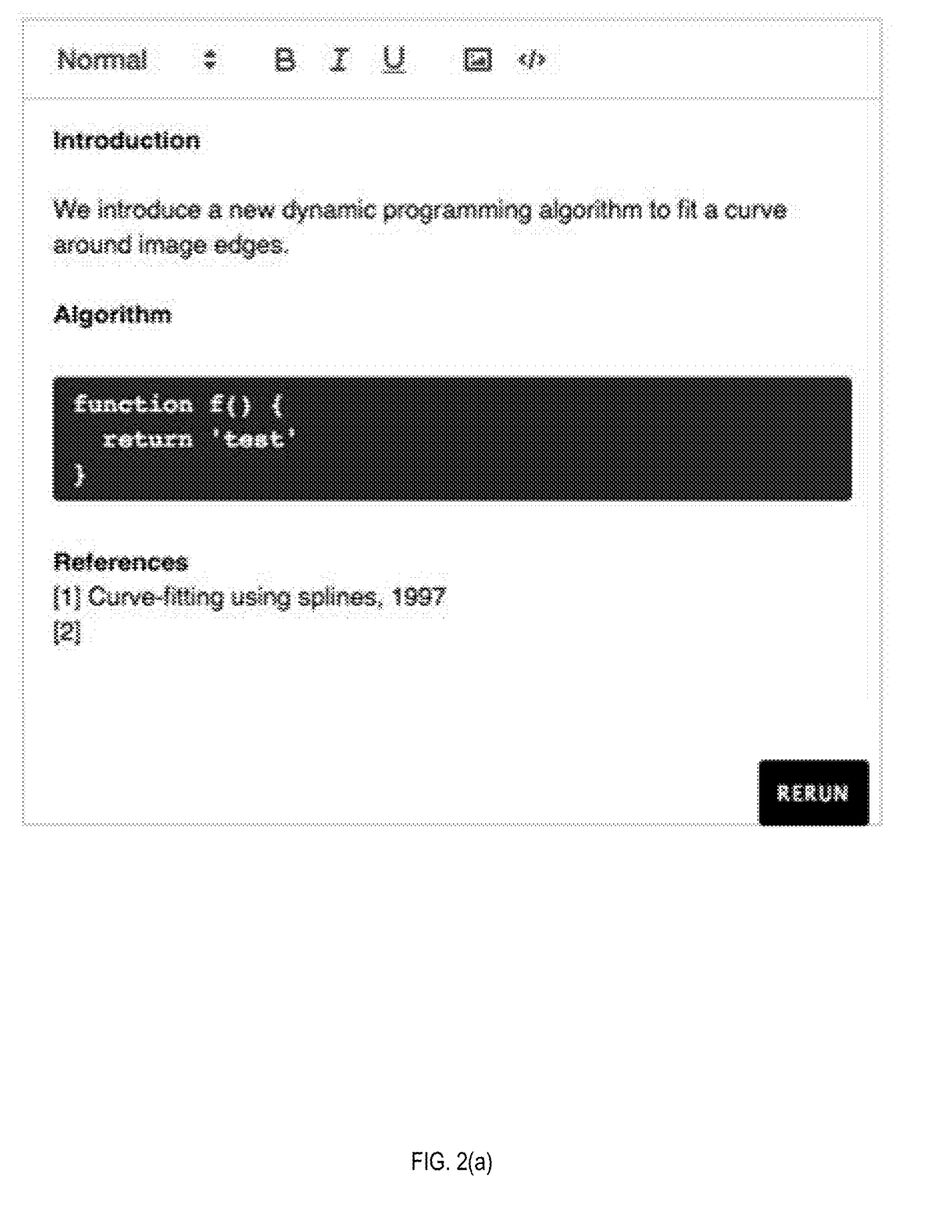
FIGS. 2(a) and 2(b) illustrate an example of editing an interactive document, in accordance with an example implementation.
Figure 2B:
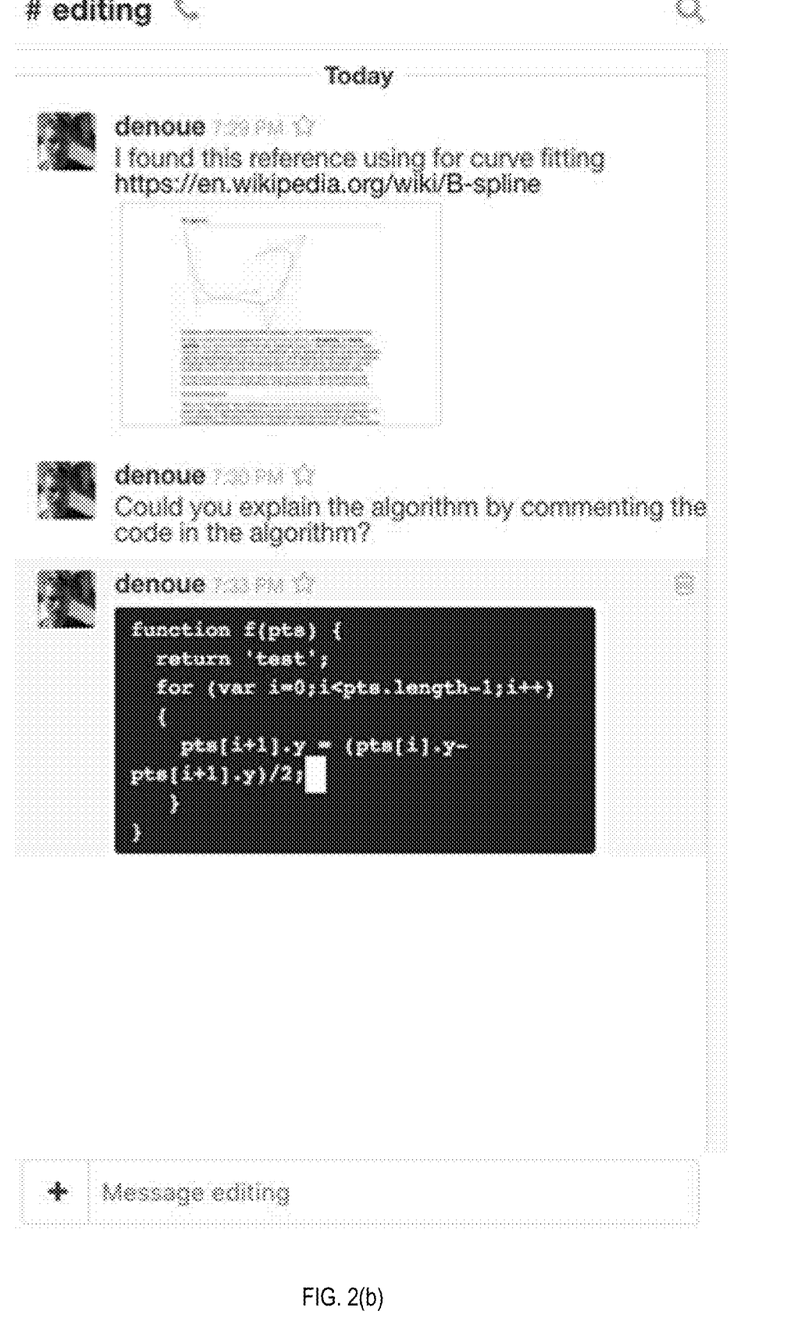

FIGS. 2(a) and 2(b) illustrate an example of editing an interactive document, in accordance with an example implementation. In a document editor as illustrated in FIG. 2(a) a full complement of menus can be provided. In the chat application example of FIG. 2(b), a user may want to edit the code only. When the editable fragment is inserted in the chat application of FIG. 2(b), the representation changes slightly (the user interface (UI) is removed and text reflowed), but all edits are reflected in the main document immediately.

Figure 3:
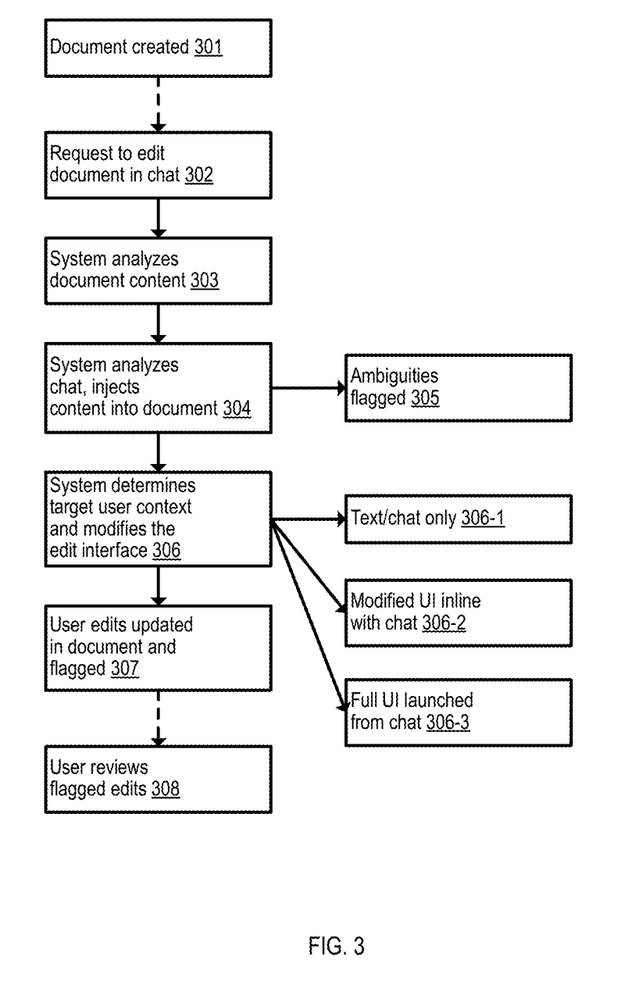
FIG. 3 illustrates an example system data flow, in accordance with an example implementation.

FIG. 3 illustrates an example system data flow, in accordance with an example implementation. The data flow diagram of FIG. 3 illustrates the basic analysis and interaction flow of the document. Initially, someone creates a document or template at 301, and at a later time sends a request in a chat window that a certain part of the document needs to be edited at 302. The system first analyzes the document at 303, segmenting individual regions that can be edited separately as described in detail below. Next at 304, the system continuously monitors the chat content occurring just before and after the document is uploaded to the chat as well as content that appears to include references to the document. If the system detects matches between editable document segments and pre-specified chat content, the system automatically injects content into the document. In many cases, there is at least some chance that the added content includes errors. Thus, the system therefore also injects comments that flag for the user all of the automatically injected content, including ambiguities if needed at 305.

Next, the system determines the context of use of the user, and adjusts its interface appropriately at 306. Such interfaces can include a text/chat only system 306-1, a modified UI inline document editing interface with chat 306-2, and a full document editing UI launched from the chat application 306-3. For example, if the user is on a standard desktop chat system, the system injects the appropriate editable document fragment. If the user is on a mobile device but has elected to interact with the phone, the system injects a simplified version of the editable graphical interface; if the mobile user has elected to use text or spoken chat to interact, the system injects a message into the chat that it is listening to commands (e.g., via a chatbot). In this final case, as the user types or speaks and edits are made to the document the system sends back an updated, non-editable view of the current version of the document. The system again tracks and highlights changes for users to review later.

Depending on the chat application, the chat application can also employ a widget configured with a web editor configured to provide a UI for documents in a document object model in JavaScript Objet Notation (JSON), which can then be brought into any web based chat application format that you can then bring to any kind of web page. When input is made to such a UI, modifications are sent back to the server managing the document.

If the document is provided in a remote server configured to provide a remote desktop solution, another example implementation can involve loading the document in the remote desktop solution and streaming the document to the chat application. The stream can be in video format, picture format, or can also be provided by the remote desktop solution, depending on the desired implementation.

Further, if a document fragment involving a form element is inserted into the chat, depending on the desired implementation, the system can adjust the interface at 306 to provide the form element in a different or preferred modality. At the flow of 306, the system can convert the modality of the form element of the document fragment into another modality and insert the new modality into the chat of the chat application.

For example, if the underlying document fragment contains a document modality of radio buttons (e.g., for a selection of shirt sizes with radio buttons for selections of small, medium or large), example implementations can utilize widgets to convert a document fragment with radio buttons to a different modality (e.g., pure text question format with a fillable text form field—"Choose your shirt size 1. Small, 2. Medium, 3. Large", rendering the question in audio, etc.), whereupon input made into the converted modality can be converted back to input for the original modality of the document fragment. The above is an example, and should not be considered to be limiting in any sense. In example implementations, widgets can be utilized to convert any modality of a document fragment to a different or preferred modality (e.g., fillable text form field converted to audio, radio buttons converted to check boxes, number fields converted to drop down boxes, etc.).

Such an implementation can be utilized for chat applications that utilize UIs that do not support interactive elements, or in situations (e.g., pure audio situation), where there may not be an appropriate method within the chat application to represent the original modality.

Figure 4:
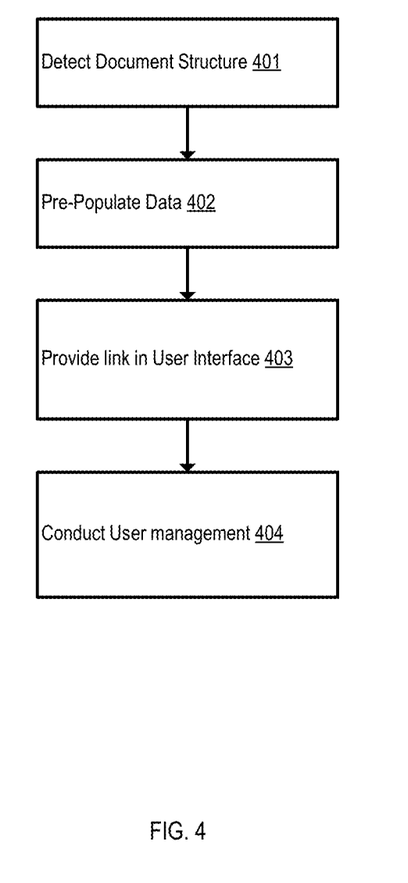
FIG. 4 illustrates an example flow for detecting editable content, in accordance with an example implementation.

FIG. 4 illustrates an example flow for detecting editable content, in accordance with an example implementation. The system carries out the following flow to detect editable content, inject content into the document, and allow the user to edit the document fragment. At 401, the system conducts document structure detection. The document structure detection can be conducted through any desired implementation to detect form fields from documents. For example, if the document readily contains form fields, existing tools can be used to extract the fields along with their bounding boxes. When a document is only a template (e.g., a trip report to a conference), the system can be configured to extract header names and creates unique placeholders inside the chat application for each detected header.

To support existing file formats, example implementations can utilize converters. For example, the HTML is parsed to find headers, sub-headers, images, tables. HTML-based online editors can provide an application programming interface (API) to extract portions of the document. The system can leverage such editors to inject fragments into the chat application. Also, if the chat runs on a small screen device such as a mobile device, the system can be configured to instantiate the HTML-based editor with the content, hiding menus.

At 402, the system is configured to conduct pre-population of data. Forms are usually associated with a caption (e.g., name, address, zip-code). The forms can be grouped into meaningful fragments instead of sending out one field at a time into the chat space. For example, the system can group personal information such as first and last names and date of birth. Similarly, multiple check boxes are shown as one fragment when they are semantically or graphically linked. If the source document is a scanned document or PDF, image and text processing techniques can be used to infer the proper segmentation. Some fields such as a date can be validated and limit the keys shown to the user using customized keyboard (e.g. only numbers when a date is required). Unlike text-centric messaging, the example implementations thus may create easier and more secure ways to edit and fill out the document fragments.

For document templates, a section containing "flowchart" can be pre-populated with shared images containing images of flowcharts that users could have shared beforehand while chatting. The flowcharts are also brought from documents that were linked to in the chat space and talked about. Similarly, a section referring to "references" is pre-populated with links to documents shared in the chat space.

In cases in which there is a document creation or editing process is sufficiently repeated, it is also possible to automatically learn associations from linguistic features in the chat with sections in a template. Such an implementation requires an appropriate training set derived from archival data. Thus, in addition to keyword-based pre-population described above, a complementary machine learning component may also be utilized in example implementations. In another example implementation, documents can be parsed into one or more fragments based on the segmentation as described above, whereupon a particular segment is provided to the chat of the chat application based on the chat content, such as matching keywords in the chat content to the particular field name or header name associated with the fragment. Such fragments can then be inserted in proximity to the chat content with the particular keywords automatically, or through a selection within a peripheral display of recommended documents with document fragments that are provided based on the keywords.

At 403, the system provides a link in the UI. When a message or image is used to pre-populate a document fragment, the UI indicates the link, e.g. a blue background shows all messages used from the chat space to pre-populate the "references" section. Visually, users can quickly scan the chat messages to see what and how much of their conversation was used to pre-populate the different document fragments. The users can also manually take in and out individual messages and their components (e.g. take in an image that was not used to pre-populate a trip report).

At 404, the system conducts user management for the document fragments. Some document fragments can naturally be linked to specific users, who can be assigned to editing this fragment. For example, a financial analyst in the team would be assigned to edit the table in the market research section. This can be conducted through any desired implementation.

Figure 5:
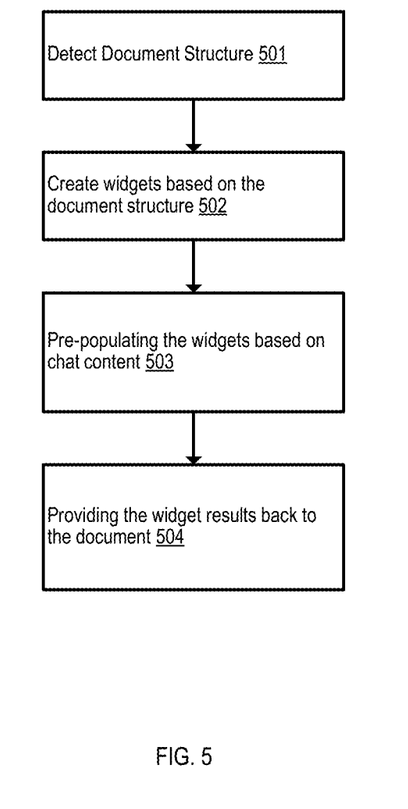
FIG. 5 illustrates an example overall flow, in accordance with an example implementation.

FIG. 5 illustrates an example overall flow, in accordance with an example implementation. At 501, the system detects the original structure of the document. At 502, the system creates widgets based on the original structure. The widgets can be an interface from the chat application to facilitate the functionality of a UI as described in the flow of 306-1, 306-2, and 306-3 of FIG. 3. At 503, the system pre-populates the widgets with existing content found in the chat channel (s) as described in FIG. 3 and FIG. 4. At 504, the results of the widgets are then provided back to the original document as illustrated in FIGS. 1(a), 1(b), 2(a) and 2(b).

Figure 6:
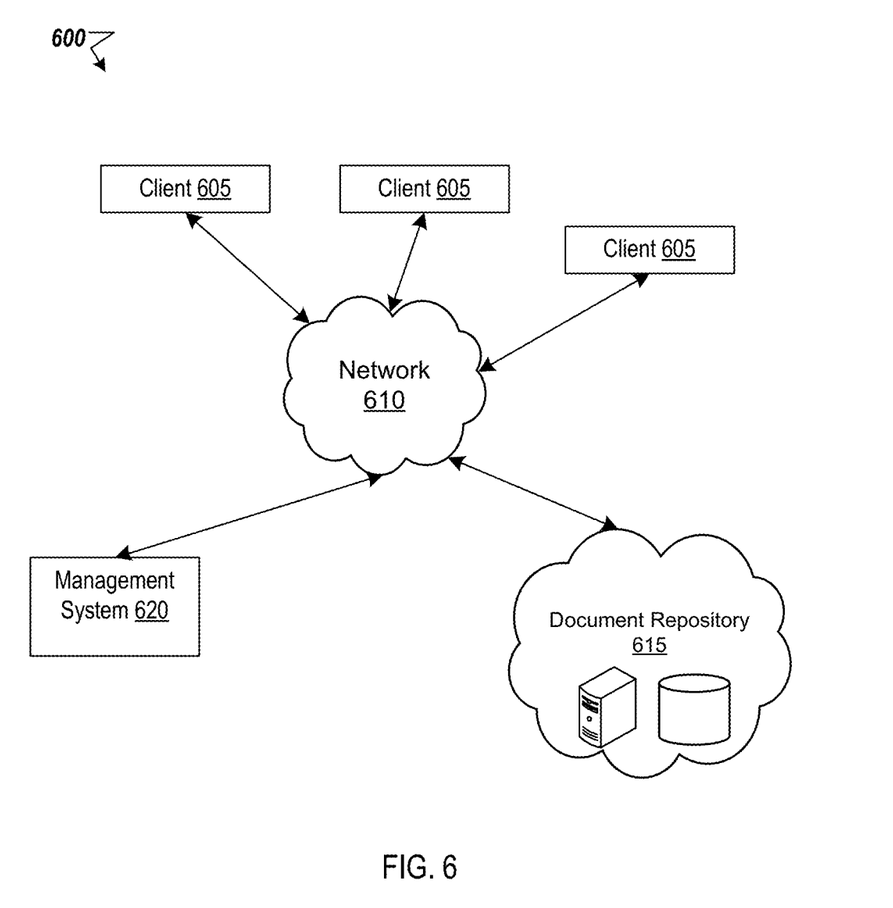
FIG. 6 illustrates an example environment upon which example implementations may be applied.

FIG. 6 illustrates an example environment 600 upon which example implementations may be utilized. Specifically, one or more client devices 605 may be communicating to each other via a network 610 through the use of a chat application. Network 610 may be in the form of a local area network (LAN) or wide area network (WAN) depending on the desired implementation. The chat application may include a widget that executes the example implementations, or the example implementations may be managed by a management system 620 which facilitates the functionality of the chat application. A document repository 615 may also be utilized to store documents for each of the client devices 605, and can be in the form of a cloud storage system or other storage system depending on the desired implementation. The client devices can retrieve a document from the document repository 615 for insertion into a chat of the chat application. Other example implementations are also possible, and the present disclosure is not limited by the environment 600 depicted in FIG. 6. For example, management system 620 may be omitted if the desired implementation is to facilitate the example implementations at the client device 605. Further, document repository 615 may also be omitted if the documents are to be provided by the client device 605 instead.

Figure 7:
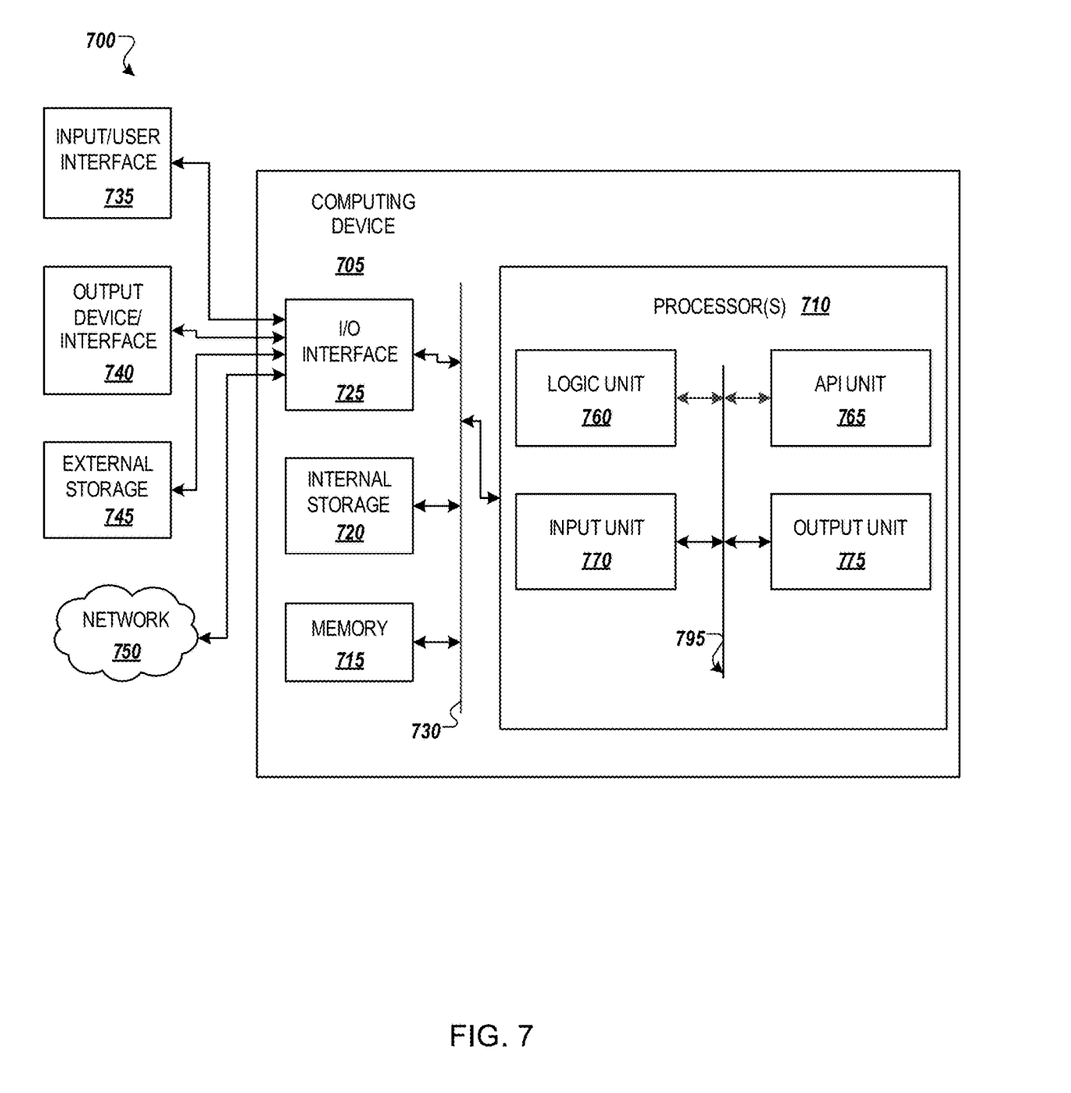
FIG. 7 illustrates an example computing environment with an example computer device suitable for use in some example implementations.

FIG. 7 illustrates an example computing environment with an example computer device suitable for use in some example implementations, such as an apparatus or management system 620 to facilitate the management of a messaging application along with a database of documents, or a client device 605 as described in FIG. 6.

Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Memory 715 can be configured to manage document segments along with header/metadata/form field names associated with the document segments to determine when a document is being mentioned in the messaging application. Memory 715 can also be configured to manage a database of documents as shown in document repository 615, each document having associated segments providing information regarding the fragments of the document.

Processor(s) 710 can be configured to, for input provided to a messaging application, parse the input to determine the relevant document fragment. Processor(s) 710 can be further configured to embed at least one of a selected document fragment or document link.

Processor(s) 710 may be configured to detect, in a chat of the chat application, an indication to edit a document through a request to edit a document in chat as illustrated at flow 302 of FIG. 3. Such an implementation can involve automatically detecting the keywords associated with the header/metadata/form field names associated with the document segments in context with a document previously referenced in the chat of the chat application, through a drag and drop of a document fragment into the chat application, or through other methods according to the desired implementation. Processor(s) 710 may be configured to insert a fragment of the document into the chat of the chat application, the fragment configured to be editable within the chat of the chat application as illustrated in the flow of 306, 306-1, 306-2, and 306-3 of FIG. 3.

Processor(s) 710 may be configured to modify the document based on input made to the fragment of the document in the chat of the chat application as illustrated in the flow 304, 307 and 308 of FIG. 3. The input can include data harvested from the chat content and inserted into the fragments as input to pre-populate the fragments with data, such as illustrated in the flows of 402 of FIG. 4 and 503 of FIG. 5. Such information can be done based on the document structure (e.g., for a field requiring telephone number, searching the chat content for telephone number, for a field requiring a social security number, searching the chat content for the social security number, etc.), and depending on the desired implementation, can be flagged for review as illustrated in the flow of 305 of FIG. 3, which the user can confirm or change at the flow of 308 of FIG. 3.

Processor(s) 710 can also be configured to process the document into one or more fragments based on a structure of the document through use of the flow of FIG. 4 or FIG. 5. Further, processor(s) 710 can be configured to select the fragment of the document based on the indication to edit the document, through looking at the chat content for keywords that match the header/metadata/form field of the fragment, through machine learning as described herein, or through other methods according to the desired implementation.

Processor(s) 710 can further be configured to identify chat content from the chat of the chat application corresponding to the document fragment, and insert the chat content corresponding to the document fragment into the fragment of the document in the chat of the chat application based on processing the chat content as typed in the chat and extracting the data as described in the flow of 304 of FIG. 3. Processor(s) 710 can further be configured to process the document into one or more fragments based on a structure of the document, identify the chat content from the chat of the chat application corresponding to the document, pre-populate each of the one or more fragments of the document with the chat content corresponding to the document by traversing the fragments of the document and pre-populating them with data according to FIGS. 3 to 5.

Further, the fragment configured to be editable within the chat of the chat application can involve a form field extracted from the document; wherein the modifying the document based on input made to the fragment of the document in the chat of the chat application involves filling the form field in the document based on the input made to the form field in the fragment of the document in the chat of the chat application as shown in FIGS. 1(a) and 1(b). Further, the processor(s) 710 can be configured to insert a fragment of the document into the chat of the chat application, the fragment configured to be editable within the chat of the chat application through generating a document editing interface in the chat of the chat application, the document editing interface configured to receive inputs made to the fragment as illustrated in FIGS. 1(a), 1(b), 2(a) and 2(b).

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

The invention claimed is:

1. A method, comprising:
   detecting, in a chat of a chat application, an indication to edit a document;
   inserting a fragment of the document into the chat of the chat application, the fragment configured to be editable within the chat of the chat application; and
   modifying the document based on input provided to the fragment of the document in the chat of the chat application;
   wherein the fragment configured to be editable within the chat of the chat application comprises a form field extracted from the document; and
   wherein the modifying the document based on the input made to the fragment of the document in the chat of the chat application comprises filling the form field in the document based on the input made to the form field in the fragment of the document in the chat of the chat application.

2. The method of claim 1, further comprising:
   processing the document into one or more fragments based on a structure of the document, and
   selecting the fragment of the document from the one or more fragments based on the indication to edit the document.

3. The method of claim 1, further comprising:
   identifying chat content from the chat of the chat application corresponding to the document fragment; and
   inserting the chat content corresponding to the document fragment into the fragment of the document in the chat of the chat application.

4. The method of claim 3, further comprising:
   processing the document into one or more fragments based on a structure of the document,
   identifying the chat content from the chat of the chat application corresponding to the document,
   and
   pre-populating each of the one or more fragments of the document with the chat content corresponding to the document.

5. The method of claim 1, wherein the inserting the fragment of the document into the chat of the chat application, the fragment configured to be editable within the chat of the chat application comprises generating a document editing interface in the chat of the chat application, the document editing interface configured to receive inputs made to the fragment.

6. A non-transitory computer readable medium, storing instructions for executing a process, the instructions comprising:
   detecting, in a chat of a chat application, an indication to edit a document;
   inserting a fragment of the document into the chat of the chat application, the fragment configured to be editable within the chat of the chat application; and
   modifying the document based on input provided to the fragment of the document in the chat of the chat application;
   wherein the fragment configured to be editable within the chat of the chat application comprises a form field extracted from the document; and
   wherein the modifying the document based on the input made to the fragment of the document in the chat of the chat application comprises filling the form field in the document based on the input made to the form field in the fragment of the document in the chat of the chat application.

7. The non-transitory computer readable medium of claim 6, the instructions further comprising:
   processing the document into one or more fragments based on a structure of the document, and
   selecting the fragment of the document from the one or more fragments based on the indication to edit the document.

8. The non-transitory computer readable medium of claim 6, the instructions further comprising:
   identifying chat content from the chat of the chat application corresponding to the document fragment; and
   inserting the chat content corresponding to the document fragment into the fragment of the document in the chat of the chat application.

9. The non-transitory computer readable medium of claim 8, the instructions further comprising:
   processing the document into one or more fragments based on a structure of the document,
   identifying the chat content from the chat of the chat application corresponding to the document,
   and
   pre-populating each of the one or more fragments of the document with the chat content corresponding to the document.

10. The non-transitory computer readable medium of claim 6, wherein the inserting the fragment of the document into the chat of the chat application, the fragment configured to be editable within the chat of the chat application comprises generating a document editing interface in the chat of the chat application, the document editing interface configured to receive inputs made to the fragment.

11. The non-transitory computer readable medium of claim 6, wherein the inserting the fragment of the document into the chat of the chat application, the fragment configured to be editable within the chat of the chat application comprises converting a modality of the fragment of the document to another modality, and providing the another modality in the chat of the chat application; wherein input made to the another modality is converted back to input for the modality of the document fragment.

12. The apparatus of claim 11, wherein the processor is configured to insert the fragment of the document into the chat of the chat application, the fragment configured to be editable within the chat of the chat application by being configured to convert a modality of the fragment of the document to another modality, and provide the another modality in the chat of the chat application; wherein input made to the another modality is converted back to input for the modality of the document fragment.

13. An apparatus, comprising:
a processor, configured to:
  detect, in a chat of a chat application, an indication to edit a document;
  insert a fragment of the document into the chat of the chat application, the fragment configured to be editable within the chat of the chat application; and
  modify the document based on input provided to the fragment of the document in the chat of the chat application;
wherein the fragment configured to be editable within the chat of the chat application comprises a form field extracted from the document; and
  wherein the processor is configured to modify the document based on the input made to the fragment of the document in the chat of the chat application by filling the form field in the document based on the input made to the form field in the fragment of the document in the chat of the chat application.

14. The apparatus of claim 13, wherein the processor is configured to:
  process the document into one or more fragments based on a structure of the document, and
  select the fragment of the document from the one or more fragments based on the indication to edit the document.

15. The apparatus of claim 13, wherein the processor is configured to:
  identify chat content from the chat of the chat application corresponding to the document fragment; and
  insert the chat content corresponding to the document fragment into the fragment of the document in the chat of the chat application.

16. The apparatus of claim 15, wherein the processor is configured to:
  process the document into one or more fragments based on a structure of the document,
  identify the chat content from the chat of the chat application corresponding to the document,
  and
  pre-populate each of the one or more fragments of the document with the chat content corresponding to the document.

17. The apparatus of claim 13, wherein the processor is configured to insert the fragment of the document into the chat of the chat application, the fragment configured to be editable within the chat of the chat application, by being configured to generate a document editing interface in the chat of the chat application, the document editing interface configured to receive inputs made to the fragment.

* * * * *